United States Patent
Faik et al.

(10) Patent No.: US 10,065,576 B2
(45) Date of Patent: Sep. 4, 2018

(54) INNER TRIM PART FOR A MOTOR VEHICLE AND HAVING TWO LAYERS OF DIFFERENT OPTICAL CHARACTERISTICS

(71) Applicant: Faurecia Innenraum Systeme GmbH, Hagenbach (DE)

(72) Inventors: Othmane Faik, La Wantzenau (FR); Bernhard Baumann, Lustadt (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 49 days.

(21) Appl. No.: 15/197,265

(22) Filed: Jun. 29, 2016

(65) Prior Publication Data

US 2016/0375843 A1 Dec. 29, 2016

(30) Foreign Application Priority Data

Jun. 29, 2015 (DE) .................. 10 2015 212 034

(51) Int. Cl.
*B60R 13/02* (2006.01)
*B32B 27/06* (2006.01)
(Continued)

(52) U.S. Cl.
CPC ............ *B60R 13/02* (2013.01); *B32B 27/065* (2013.01); *B32B 27/20* (2013.01); *B32B 27/40* (2013.01); *B32B 7/02* (2013.01); *B32B 27/304* (2013.01); *B32B 2255/10* (2013.01); *B32B 2255/26* (2013.01); *B32B 2264/10* (2013.01); *B32B 2264/102* (2013.01); *B32B 2266/0278* (2013.01); *B32B 2307/306* (2013.01); *B32B 2307/40* (2013.01); *B32B 2307/4026* (2013.01); *B32B 2307/416* (2013.01); *B32B 2307/732* (2013.01); *B32B 2307/738* (2013.01);
(Continued)

(58) Field of Classification Search
CPC ....... B60R 13/02; B32B 27/065; B32B 27/20; B32B 27/40
USPC .............................................. 296/146.7, 1.08
See application file for complete search history.

(56) References Cited

U.S. PATENT DOCUMENTS 8,202,616 B2 * 6/2012 Suzuki .................... B32B 27/20
428/411.1
2009/0268278 A1 * 10/2009 Suzuki .................... B32B 27/20
359/359
(Continued)

FOREIGN PATENT DOCUMENTS

DE 19928235 4/2000
WO WO02057374 7/2002

*Primary Examiner* — Jason S Morrow
(74) *Attorney, Agent, or Firm* — Faegre Baker Daniels LLP

(57) ABSTRACT

An inner trim part for a motor vehicle, with a first layer which faces an interior of the motor vehicle after the installation of the inner trim part, and a second layer which is away from the interior of the motor vehicle after the installation of the inner trim part. The first layer comprises at least one material or a material composite which absorbs at least 50 percent of an incident electromagnetic radiation in the visible wavelength region and reflects at least 50 percent of an incident electromagnetic radiation in the infrared region. The second layer comprises at least a material or a material composite which reflects at least 50 percent of an incident electromagnetic radiation in the visible wavelength region as well as an electromagnetic radiation in the infrared wavelength region.

11 Claims, 3 Drawing Sheets

(51) Int. Cl.
*B32B 27/20* (2006.01)
*B32B 27/40* (2006.01)
B32B 7/02 (2006.01)
B32B 27/30 (2006.01)

(52) U.S. Cl.
CPC ..... *B32B 2451/00* (2013.01); *B32B 2605/003* (2013.01); *B60R 2013/0287* (2013.01)

(56) References Cited

U.S. PATENT DOCUMENTS

| | | | |
|---|---|---|---|
| 2010/0144980 A1* | 6/2010 | Fujibayshi | B29C 41/18 525/457 |
| 2011/0287230 A1* | 11/2011 | Akuzawa | B32B 3/30 428/179 |
| 2014/0050886 A1 | 2/2014 | Burgin et al. | |
| 2016/0229991 A1* | 8/2016 | Diaz | C08K 3/22 |

\* cited by examiner

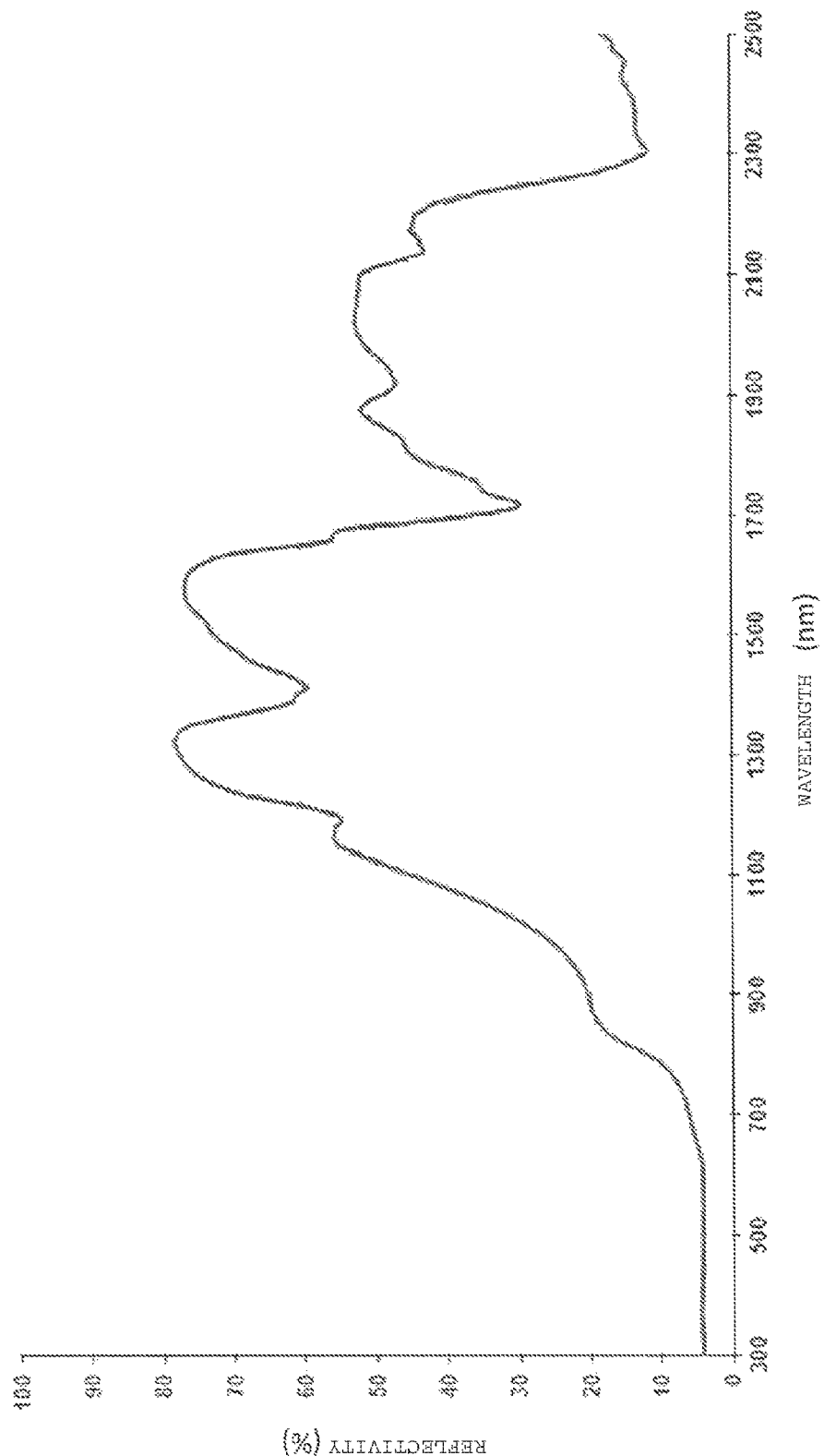

INNER TRIM PART FOR A MOTOR VEHICLE AND HAVING TWO LAYERS OF DIFFERENT OPTICAL CHARACTERISTICS

CROSS-REFERENCE TO RELATED APPLICATION

This application claims priority to German Application No. 10 2015 212 034.1, filed Jun. 29, 2015, which is herein incorporated by reference in its entirety.

TECHNICAL FIELD

The present disclosure relates to an inner trim part for a motor vehicle comprising two layers which have different optical characteristics, in particular, different reflection and absorption characteristics, depending on a wavelength of incident electromagnetic radiation.

BACKGROUND

Interiors of vehicles, which are subjected to high solar radiation, heat up, due to absorption of incident components in the infrared wavelength region of the solar radiation. Pigments which reflect the infrared radiation are incorporated into these surfaces of the interiors, in order to minimise the heating of these surfaces. This procedure however is disadvantageous inasmuch as such large quantities of infrared-reflecting pigments must be incorporated, that the colour spectrum is limited. In particular, it is hardly possible to realise dark colours.

SUMMARY

The present disclosure discloses an inner trim part for a motor vehicle, which avoids the above mentioned disadvantage, and minimises or prevents heating of the inner trim part.

The inner trim part according to the disclosure, for a motor vehicle, comprises a first layer and a second layer. The first layer faces an interior of the motor vehicle after installation of the inner trim part, whereas the second layer is away from the interior of the motor vehicle after the installation. The first layer comprises a material or a material composite which absorbs at least 50 percent of incident electromagnetic radiations in the visible wavelength region and reflects at least 50% of incident electromagnetic radiation in the infrared region. The second layer comprises at least one material or a material composite, which reflects at least 50% of an incident electromagnetic radiation in the visible wavelength region and reflects at least 50 percent of an incident electromagnetic radiation in the infrared wavelength region.

Heating of the inner trim part is minimised due to the fact that the incident radiation in the infrared wavelength region from the solar radiation is partly reflected by the first layer. This heating however is additionally minimised by the second layer which reflects the component of the incident electromagnetic radiation which has gotten through the first layer and up to the second layer. With regard to the infrared radiation, thus a first reflection is carried out at the first layer and a second reflection at the second layer, so that effectively a larger component of this radiation which is of particularly significance with regard to heating is reflected. With regard to electromagnetic radiation in the visible wavelength region, this is likewise reflected at the second layer, so that the component of radiation in the visible region which is let through the first layer, is again party reflected. A reflectivity or an absorption of 50 percent of the incident radiation of a certain wavelength region can be with respect to the total radiation of the wavelength region, or, within the scope of this document, can be with respect to an average value, or a mean value of the intensity of the respective wavelength region, since an intensity of incident radiation is not equally large for all wavelengths of this radiation. In some embodiments, the first layer and the second layer are designed in a manner such that electromagnetic radiation is reflected in the near-infrared wavelength region, in each case by at least 50 percent.

Electromagnetic radiation in the visible wavelength region is hereby to be understood as electromagnetic radiation with a wavelength between 400 nm and 780 nm, whereas electromagnetic radiation in the infrared wavelength region is to be understood as electromagnetic radiation of a wavelength between 780 nm to 1000 μm. Electromagnetic radiation in the near-infrared in these documents is to encompass electromagnetic radiation with wavelengths between 780 nm and 3 μm.

One can envisage the first layer being a decor skin, in order to protect the inner trim part from detrimental mechanical effects, as well as to ensure suitable aesthetics. In some embodiments, the first layer is designed as a slush skin, thus as a skin which is manufactured by a slush process or rotation sintering, as a skin manufactured by way of spraying polyurethane, or thermoformed foil. This permits mechanically stable layers with the desired optical characteristics to be created in a simple and rapid manner.

The second layer can be a foam layer which with regard to its optical characteristics can likewise be set in an uncomplicated manner and ensures a desired haptics of the inner trim part. The foam layer can be formed of a polyurethane foam, but it can also be formed of polyethylene, polypropylene or polyvinyl chloride. In some embodiments, the foam layer itself can be of the material reflecting electromagnetic radiation in the infrared wavelength region, so that the desired optical characteristics are realised without an additional material or substances.

The first layer and/or the second layer can comprise a pigment for reflecting the electromagnetic radiation in the infrared wavelength region. The optical characteristics can be set as desired, by way of the addition of pigments, without the material composite which is formed by way of this negatively influencing the appearance or the mechanical characteristics of the respective layer. In some embodiments, the pigment is an inorganic pigment, in some embodiments a metal oxide or metal hydroxide, and in some embodiments bismuth vanadate pigment, lead chromate pigment, molybdenum red pigment, cersuphide pigment, silicate pigment, perylene tetracarboxylic acid diimide pigment and/or iron chromium haematite pigment. In some embodiments, the pigment has the pigment Spinel Black (colour Index (C.I.) Pigment Black 30) or chrome oxide green (C.I. Pigment Green 17).

The second layer for reflecting the electromagnetic radiation in the visible wavelength region can comprise a pigment, in some embodiments titanium oxide pigments, lithopone, barium sulphate pigment (C.I. Pigment 21 or C.I. pigment 22), zinc oxide pigment (C.I. Pigment 4), zinc sulphide pigment (C.I. pigment 7) and/or lead carbonate pigment.

The respective layer, thus the first layer or the second layer can comprise at least 0.5 mass percent to 3 mass percent, and in some embodiments at least 1 mass percent to 2.8 mass percent of the pigments, in order to obtain the desired characteristics.

One can envisage the first layer and/or the second layer being designed to reflect at least 60 percent, in some embodiments at least 70 percent, and in some embodiments at least 80 percent of the occurring electromagnetic radiation in the infrared wavelength region. The first layer can likewise be designed in a manner such that at least 60 percent, in some embodiments at least 70 percent, and in some embodiments at least 80 percent of the incident electromagnetic radiation in the visible wavelength region is absorbed.

In some embodiments, the second layer has a light colour, so that the correspondingly coloured second layer can reflect at least 50 percent of the incident electromagnetic radiation in the visible wavelength region, and in some embodiments at least 60 percent of this radiation. The reflection behaviour of the second layer can already be set as desired by way of a suitable colouring. In some embodiments, the colour of the second layer is preferably white, which in particular is to be understood as a hue with the value RGB=(255, 255, 255) in the RGB colour space with a maximal value 225 or hues with three identical coordinates in each case of larger than 220 in the RGB colour space. A natural reflectivity is utilised by way of applying a white foam layer. White foam layers are normally not arranged beneath decor skins or other cover layers of inner trim parts, since in the case of a reflection of the cover layer the white background shines through and reflections can occur at a window of the vehicles, but they however provide surprisingly good characteristics concerning the reduced heating of a vehicle interior.

The first layer can have a dark colour. In some embodiments, the respectively coloured first layer can absorb at least 50 percent of the incident electromagnetic radiation in the visible wavelength region, and in some embodiments at least 60 percent of this radiation. In some embodiments, the colour of the first layer is black, which is to be understood as a hue with the value RGB=(0, 0, 0) in the RGB colour space with a maximal value of 225 or hues with three identical coordinates in each case smaller than 120 in the RGB colour space.

The inner trim part alternatively or additionally comprises a substrate of a plastic, in some embodiments of polyvinyl chloride, polyethylene, polypropylene or polyurethane, on which substrate the first layer and the second layer are arranged. Hereby, the second layer is arranged on the substrate in a directly contacting manner, thus is in direct contact with this. One can also envisage the first layer and the second layer being arranged in direct contact with one another. In some embodiments, the substrate is formed from polycarbonate/acrylonitrile butadiene styrene (PC/ABS), acrylonitrile butadiene styrene (ABS), polycarbonate (PC), polyester or polyoxymethylene.

In some embodiments, the first layer comprises a thickness between 0.5 mm and 2 mm, and in some embodiments the second layer has a thickness between 1 mm and 20 mm. The substrate can be between 1.5 mm and 5 mm thick.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

There are shown in.

Figure 1:
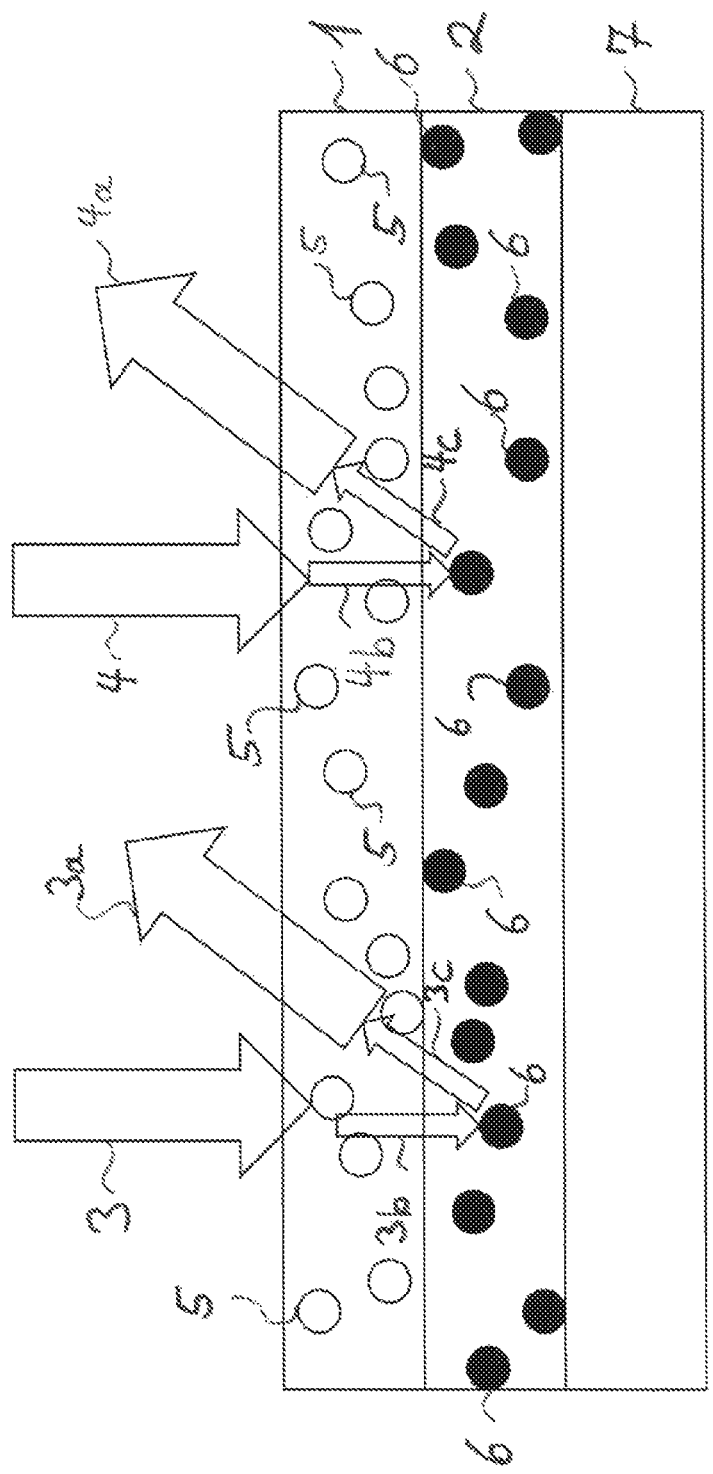
FIG. 1 a lateral sectioned view of an inner trim part.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

FIG. 1 in a lateral sectioned view shows an inner trim part with several layers. A foam layer 2 as a second layer is deposited with direct contact, thus directly touching contact, onto a decor skin 1 as a first layer. The foam layer 2 in turn is in direct contact with a substrate 7 of polyvinyl chloride. The decor skin 1 as a cover layer of the inner trim part faces a vehicle interior after the installation of the inner trim part into a motor vehicle, whereas the substrate 7 is away from the vehicle interior. The represented vehicle inner trim part is an instrument panel or dashboard, but in some embodiment examples can also be an arm rest or a trunk (boot) covering.

The decor skin 1 is of a black leather or artificial leather, into which the pigment 5 is incorporated. The decor skin 1 can alternatively also be coated by the pigments 5. In some embodiment examples, the decor skin 1 can also be a slush skin or be formed by way of spraying polyurethane or be designed as a thermoformed foil. The decor skin 1 due to its colouring is already designed to absorb at least 50 percent of an incident electromagnetic radiation in the visible wavelength region 3, for example a visible component of the solar radiation. The remaining component 3a is reflected. The component of absorbed, visible radiation or of the absorbed visible light, in some embodiments, can also be more than 60 percent, for example at least 70 percent or at least 80 percent.

Simultaneously, at least 50 percent of an incident electromagnetic radiation in the infrared wavelength region 4, such as in the near-infrared wavelength region, is reflected by the pigments 5 into the vehicle interior, and the remaining component is absorbed.

The foam layer 2 is of a white polyurethane foam, into which additionally titanium oxide pigments 6, in particular rutile dioxide which is to say titanium dioxide pigments are incorporated. A component 3b of the visible electromagnetic radiation 3 which is initially incident upon the inner trim part and which penetrates the decor skin 1 and reaches the foam layer 2, there is reflected due to the colouring of the foam layer 2 and the titanium oxide pigments 6, and this reflected component 3c together with the component 3a already reflected at the decor skin 1, is radiated back into the vehicle interior. The foam layer 2 is thus designed to reflect at least 50% of the electrometric radiation in the visible wavelength region which is incident upon it.

Likewise, a component 4b of the infrared radiation which gets through the decor skin 1 up to the foam layer 2 is reflected by the material composite of the foam layer 2 and this reflected component 4c is superimposed with the component 4a which is already reflected at the decor skin 1. The foam layer 2 is thus constructed such that at least 50 percent of the electromagnetic radiation in the infrared wavelength region is reflected.

Figure 2:
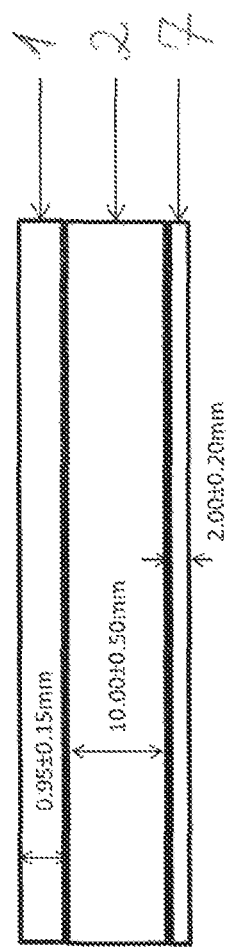
FIG. 2 a view corresponding to FIG. 1, of a further embodiment example of the inner trim part and
FIG. 3 reflection characteristics of the arrangement represented in FIG. 2.

FIG. 2 in a lateral view corresponding to FIG. 1 shows a further embodiment of the inner trim part. Recurring features in this as well as in the following figure are provided with identical reference numerals. In some embodiments, the substrate 7 is formed from polycarbonate without pigments incorporated therein. The substrate is 2 mm±0.2 mm thick.

The second layer 2 which is formed in direct touching contact on the substrate 7 is a polyurethane foam with 1 mass percent of $TiO_2$ pigments, for example DuPont™ Ti-Pure®. A thickness of the second layer 2 is 10 mm±0.5 mm.

The first layer 1, which is deposited on the second layer 2 and is in direct contact with this, is of plasticised polyvinyl chloride, into which 2.8 mass percent $CrFeO_3$ pigments, for example BASF Sicopal® Black L 0095 is incorporated. The first layer, in some embodiment examples, is finally 0.95 mm±0.15 mm thick.

The reflection as a percentage detail of the incident electromagnetic radiation of the respective wavelength is plotted against the wavelength of the electromagnetic radiation which is specified in nm, in a diagram in FIG. 3. The curve characterises the reflection capacity or capability of the configuration of the inner trim part which is shown in FIG. 2, and in particular the increased reflectivity for wavelengths in the infrared region.

Various modifications and additions can be made to the embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. An inner trim part for a motor vehicle, comprising:
   a first layer which faces an interior of the motor vehicle after the installation of the inner trim part; and
   a second layer which is away from the interior of the motor vehicle after the installation of the inner trim part,
   wherein the first layer comprises at least one material or a material composite which absorbs at least 50 percent of an incident electromagnetic radiation in the visible wavelength region and reflects at least 50 percent of an incident electromagnetic radiation in the infrared region, and the second layer comprises at least a material or a material composite which reflects at least 50 percent of an incident electromagnetic radiation in the visible wavelength region as well as of an electromagnetic radiation in the infrared wavelength region.

2. An inner trim part according to claim 1, characterised in that the first layer is a decor skin designed as a slush skin manufactured by way of spraying polyurethane or thermoformed foil.

3. An inner trim part according to claim 1, characterised in that the second layer is a foam layer, wherein the foam layer itself is formed from the material reflecting the electromagnetic radiation in the infrared wavelength region.

4. An inner trim part according to claim 3, characterised in that the foam layer comprises a polyurethane foam.

5. An inner trim part according to claim 1, characterised in that the first layer and/or the second layer comprises an inorganic pigment including bismuth vanadate pigment, lead chromate pigment, molybdenum red pigment, cersuphide pigment, silicate pigment, perylene tetracarboxylic acid diimide pigment and/or iron chromium haematite pigment, for reflecting the electromagnetic radiation in the infrared radiation region.

6. An inner trim part according to claim 5, characterised in that the respective layer comprises at least 0.5 mass percent to 3 mass percent of the pigments.

7. An inner trim part according to claim 1, characterised in that the second layer comprises a pigment including titanium oxide pigment, lithopones, barium sulphate pigment, zinc oxide pigment, zinc sulphide pigment, and/or lead carbonate pigment, for reflecting the electromagnetic radiation in the visible wavelength region.

8. An inner trim part according to claim 7, characterised in that the respective layer comprises at least 0.5 mass percent to 3 mass percent of the pigments.

9. An inner trim part according to claim 1, characterised in that the second layer has a light colour that reflects at least 60 percent of the incident electromagnetic radiation in the visible wavelength region.

10. An inner trim part according to claim 1, characterised in that the first layer has a dark colour that absorbs at least 60 percent of the incident electromagnetic radiation in the visible wavelength region.

11. An inner trim part according to claim 1, characterised in that the inner trim part comprises a substrate of plastic, on which the first layer and the second layer are arranged.

* * * * *